Nov. 19, 1963  D. J. JAY  3,111,093
AIR SUPPORTED VEHICLE
Filed Dec. 28, 1961  6 Sheets-Sheet 5

DAVID J. JAY
INVENTOR.

BY
J. R. Faulkner
K. L. Zerschling
ATTORNEYS

Nov. 19, 1963 D. J. JAY 3,111,093
AIR SUPPORTED VEHICLE
Filed Dec. 28, 1961 6 Sheets-Sheet 6

DAVID J. JAY
INVENTOR.

BY J. R. Faulkner
K. L. Zuschling
ATTORNEYS

United States Patent Office 3,111,093
Patented Nov. 19, 1963

3,111,093
AIR SUPPORTED VEHICLE
David J. Jay, Detroit, Mich., assignor to Ford Motor Company, Dearborn, Mich., a corporation of Delaware
Filed Dec. 28, 1961, Ser. No. 162,901
12 Claims. (Cl. 104—134)

This invention relates to a high speed transportation system employing an air supported vehicle and more particularly to a suspension system for supporting the vehicle on a surface having a substantial horizontal component. Means may also be provided for guiding the vehicle along a surface having a substantial vertical component.

In the preferred form of the invention the surfaces having the substantial horizontal component and the substantial vertical component are two surfaces of a rail. The rail may be formed into a box-like section in which the surface having the substantial horizontal component is positioned in a substantially horizontal plane and the surface having the substantial vertical component is positioned in a substantially vertical plane. Means are carried by the vehicle in opposed relationship to the surface having the substantial horizontal component for supporting the vehicle by means of a thin layer of air under pressure between this means and this surface. Means may also be carried by the vehicle and positioned in opposed relationship to the surface having the substantial vertical component for guiding the vehicle by means of a thin layer of air under pressure between this means and this surface. These means may properly be termed air pressure levitation devices.

The invention includes a suspension system for interconnecting the vehicle with these air pressure levitation devices. This system includes a frame member that preferably carries at least two air pressure levitation devices positioned adjacent the surface having the substantial horizontal component and adjacent the surface having the substantial vertical component. The air pressure levitation devices may be affixed to the frame member by some type of universal mounting mechanism, for example gimbals. The frame member is supported from a structural member of the vehicle by spring means, or a torsion bar. It is also supported from the structural member of the vehicle by resilient means or a leaf spring arrangement that resists horizontal movement of the frame member relative to the vehicle.

Additionally, the frame member may carry a brake mechanism that is capable, upon energization, of engaging a surface of the rail, for example the surface having the substantial horizontal component. The frame member may also carry a safety pad that projects beneath another surface having a substantial horizontal component and that limits upward movement of the vehicle if aerodynamic lift conditions should assert large upward forces upon the vehicle.

An object of the invention is the provision of a high speed transportation system employing an air supported vehicle in which a mechanism is employed for properly springing the weight of the vehicle.

Another object of the invention is the provision of a suspension system for an air supported vehicle.

Another object of the invention is the provision of a suspension system for an air supported vehicle that will permit the vehicle to move relative to the rail system with a minimum of discomfort to passengers.

A further object of the invention is the provision of a suspension system for an air supported vehicle that resiliently positions air pressure levitation devices in spaced relationship to substantially horizontal and vertical surfaces of a rail system.

Other objects and attendant advantages of the invention will become more apparent as the specification is considered in connection with the attached drawings in which.

Figures 1, 2:
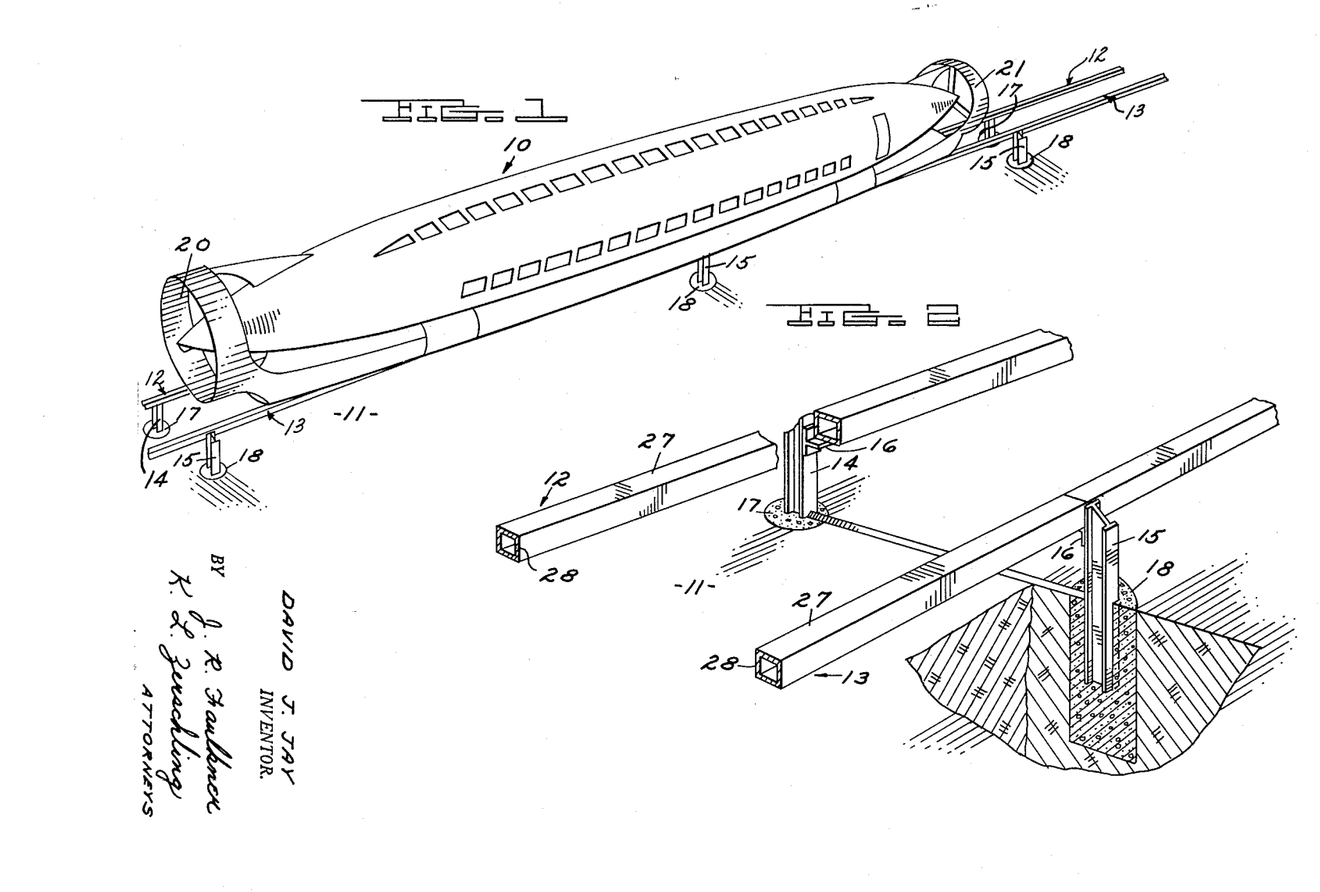
FIGURE 1 is a perspective view of the air supported vehicle and rail system of the present invention.
FIGURE 2 is a perspective view partially in section of the rail system of the present invention.

Referring now to the drawings in which like reference numerals designate like parts throughout the several views thereof, there is shown in FIGURE 1 a vehicle 10 positioned upon a rail system 11.

As shown in FIGURE 2, this rail system may consist of a pair of box-like rails 12 and 13 that are supported from pillars 14 and 15 by means of T-sections 16. The pillars 14 and 15 are supported from the ground by means of concrete foundations 17 and 18.

Figure 3:
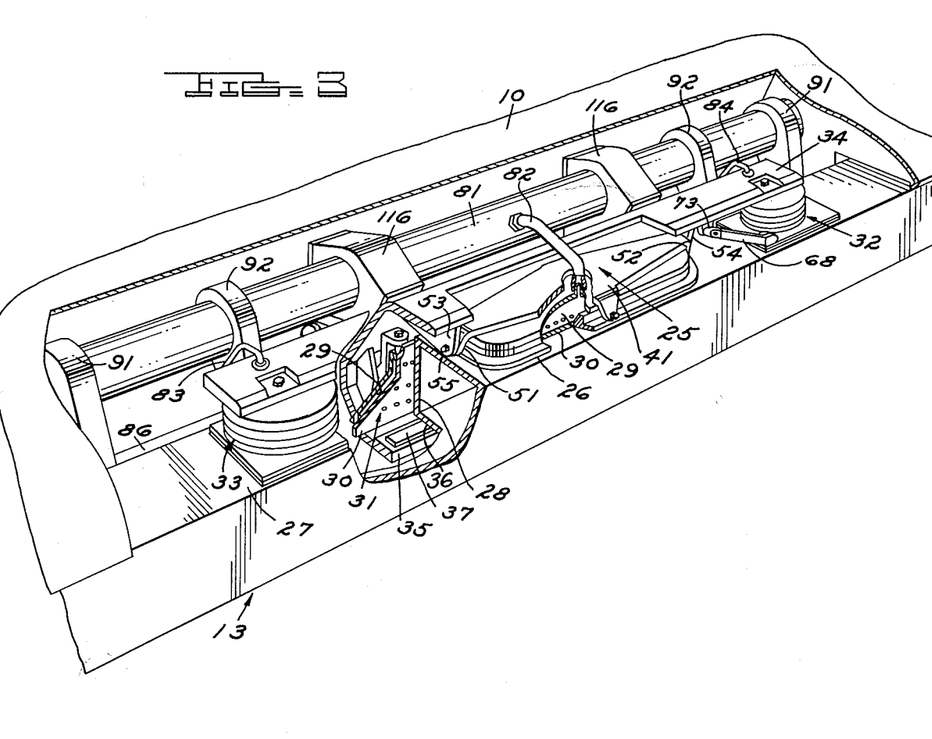
FIGURE 3 is a perspective view partially in section of the suspension system of the present invention that supports air pressure levitation devices in opposed relationship to certain surfaces of the rail system.

The vehicle 10 is suitable for carrying a number of passengers and it includes a pair of propellers 20 and 21 positioned at either end thereof for propelling it over the rail system 11. The vehicle is supported upon the rail system and is guided laterally thereon by a plurality of means that are positioned in opposed relationship to the surfaces of the rails 12 and 13. These means supply a thin layer of air under pressure between the means and the surfaces of the rail system. This arrangement can best be seen by reference to FIGURE 3 which shows a cutaway portion of the vehicle 10. A support and control mechanism generally designated by the numeral 25 includes a first means, preferably an air pressure levitation device 26, positioned in opposed relationship to the substantially horizontal surface 27 of the rail 13 for supplying a thin layer of air under pressure between itself and the surface 27. Another means, preferably an air pressure levitation device 31, is positioned in opposed relationship to the substantially vertical surface 28 of the rail 13 for furnishing a thin layer of air under pressure between itself and the substantially vertical surface 28. Both the air pressure levitation devices 26 and 31 have a plenum chamber 29 that includes a substantially flat plate 30 having a plurality of orifices positioned therein as shown in FIGURE 3. Each control and support mechanism 25, and there are a plurality of these spaced along the length of the vehicle adjacent each rail 12 and 13, includes one air pressure levitation device 26 positioned in opposed relationship to the substantially horizontal surface 27 of each rail and two air pressure levitation devices 31 positioned in opposed relationship to the substantially vertical surface 28 of each rail. As shown in FIGURE 2 the rail 12 also includes a substantially horizontal surface 27 and a substantially vertical surface 28. The air pressure levitation devices employed here and designated by the numerals 26 and 31 are preferably of the type described in co-pending application Serial No. 744,416, filed June 25, 1958, in the names of David J. Jay and Harlan W. Peithman and assigned to the assignee of the present invention.

Although the invention is described in relation to a rail system having rails 12 and 13 that each have a substantially horizontal surface 27 and a substantially vertical surface 28 it will be apparent to those skilled in the art that the invention may be employed with a vehicle that is adapted for movement over any surface having a substantial horizontal component. The vehicle may also be guided by any surface having a substantial vertical component. Also, the invention could readily be adapted to a vehicle that is designed for movement along a single rail.

The support and control mechanism 25 also includes a pair of brake mechanisms 32 and 33 positioned on either side of the air pressure levitation device 26. These two brake mechanisms, as well as air pressure levitation device 26 and two air pressure levitation devices 31, are carried by a frame member 34 which has an integrally formed laterally extending flange 35 that is positioned beneath a second substantially horizontal surface 36 of the rail 13. This flange carries a safety pad 37 constructed of a suitable friction material, for example, brake lining.

The air pressure levitation device 26 is universally mounted on the frame member 34 by means of the mechanism about to be described. This mechanism includes a cover plate 41 that has four depending flanges. Two of these flanges 42 and 43 are positioned at the sides of the air pressure levitation device 26 approximately at its midpoint. A pair of pins or nut and bolt assemblies 44 and 45 pivotally secure the air pressure levitation device 26 to the cover plate 41 by means of upstanding flanges 46 and 47 positioned on the air pressure levitation device. This pivotal axis is positioned approximately at the midpoint of the air pressure levitation device 26 and extends in the direction substantially transverse to the longitudinal axis of the vehicle 10. The other two depending flanges 51 and 52 are pinned in a pivotal relationship to depending flanges 53 and 54 of the frame member 34. These pins are similar to the pins or bolt and nut assemblies 45 and 46. One of these is shown at 55 in FIGURE 3 and the other is shown at 56 in FIGURE 5. The pivotal axis of the pins 55 and 56 extends in a direction substantially parallel to the longitudinal axis of the vehicle.

The air pressure levitation devices 31 are also universally mounted on the frame member 34 by similar arrangement which will not be described in detail. It can be seen, however, by reference to FIGURE 5 that the air pressure levitation device 31 includes a cover plate 57 that has depending flanges 58 and 59 pinned to upstanding flanges on the air pressure levitation device by means of pins or nut and bolt assemblies 60. The pivotal axis of the pins or nut and bolt assemblies 60 extends in a substantially vertical direction. The air pressure levitation device 31 is also pivotally supported by means of a pair of pins whose pivotal axis extends in a direction substantially parallel to the longitudinal axis of the vehicle.

The arrangement for universally mounting the air pressure levitation devices 26 and 31 may properly be termed as gimbals.

Figure 4:
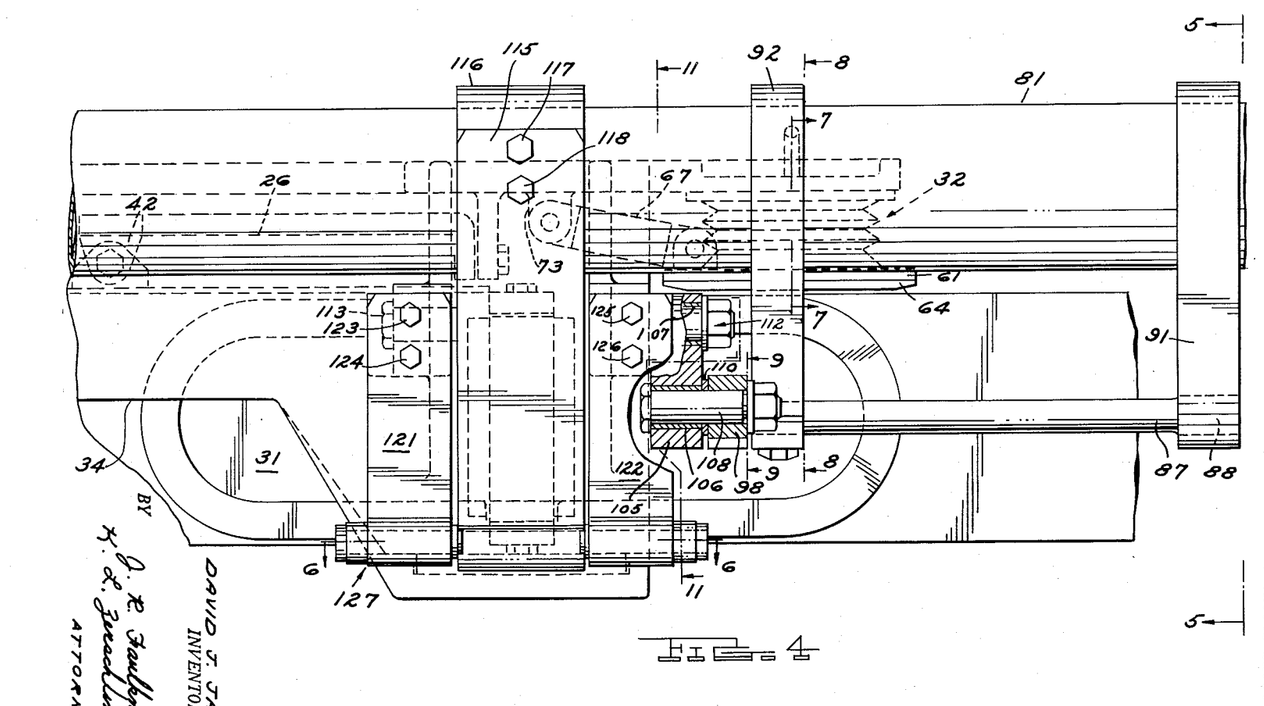
FIGURE 4 is a side elevational view partially in section of a portion of the suspension system of the present invention.
Figure 7:
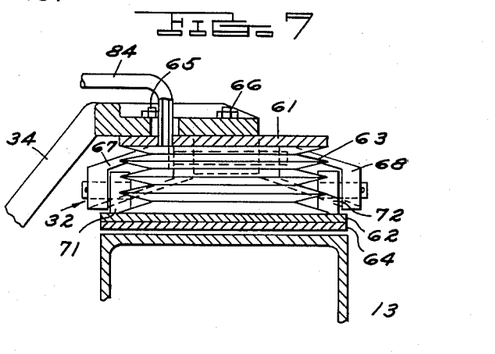
FIGURE 7 is a sectional view partially in elevation taken along the lines 7—7 of FIGURE 4.

The structure of the brake mechanisms 32 and 33 and their relationship to the frame member 34 can best be seen by reference to FIGURES 3, 4 and 7. FIGURE 7 shows a cross-sectional view of the brake mechanism 32 and this figure discloses that the mechanism includes a top plate 61 and a bottom plate 62 that are suitably connected to a bellows 63. The bottom plate 62 has affixed thereon a suitable friction material 64 preferably brake lining material of the type that is normally employed in automotive vehicles. The top plate 61 is secured to the frame member 34 by a pair of bolts 65 and 66. The lower plate 62 and the brake lining 64 are pivotally supported from the frame 34 by a pair of links 67 and 68 that are pinned to upstanding protuberances 71 and 72 on the plate member 62 and to similar depending protuberances on the frame member 34, one of which is shown at 73 in FIGURES 3 and 4. This connection permits vertical movement of the plate 62 and friction material 64 with respect to the top plate 61 and the frame 34 and permits pivotal movements of the plate 62 and the friction material 64 about an axis substantially transverse to the longitudinal axis of the vehicle.

Figure 5:
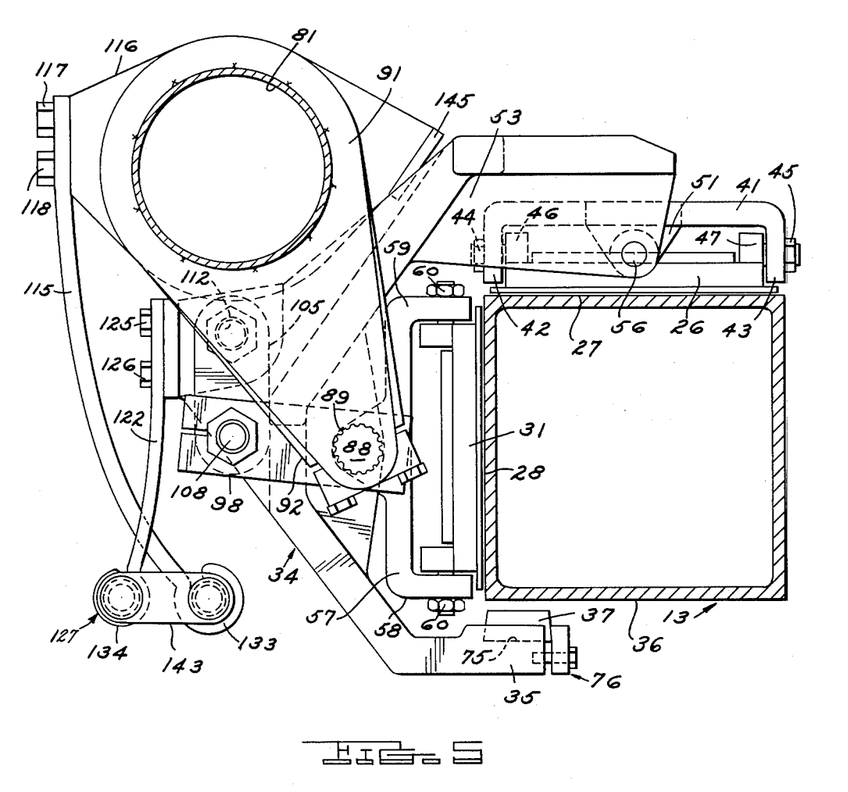
FIGURE 5 is a sectional and elevational view taken along the lines 5—5 of FIGURE 4.

By reference to FIGURE 5, it can be seen that safety pad 37 is suitably positioned within a slot 75 in the laterally extending flange 35 of the frame member 34 by means of a fastening assembly 76.

As described above, the air pressure levitation devices 26 and 31, the brake mechanisms 32 and 33 and the safety pad 37 are all connected to the frame member 34. The frame member 34 is in turn connected to a structural member of the vehicle 10. This structural member preferably takes the form of a pipe 81 that extends in a direction substantially parallel to the longitudinal axis of the vehicle. This pipe 81 may contain a suitable supply of air under pressure, that may be replenished by an air compressor (not shown) driven by the engines of the vehicle. The pipe 81 is connected to the air pressure levitation device 26 through a conduit 82 and it is to be understood that the air pressure levitation devices 31 are similarly connected to this pipe so that these air pressure levitation devices receive a continuous supply of air under pressure. In an alternative structure the air pressure levitation devices 31 that are positioned in opposed relationship to the substantially vertical surfaces of the rails may be connected to control mechanisms to selectively supply air to the devices as lateral control is called for. Devices of this nature are disclosed in co-pending applications Serial No. 162,870, filed December 28, 1961, and Serial No. 162,843, filed Dec 28, 1961, in the names of Andrew A. Kucher and Victor G. Raviolo respectively. These applications are assigned to the assignee of the present application, and application Serial No. 162,870 has matured into Patent No. 3,086,479.

When braking is needed, air under pressure may be supplied to the bellows of the brake mechanisms 32 and 33 through conduits 83 and 84. These conduits may be connected to a conventional valve mechanism that is interposed in a line between a source of air under pressure and the brake mechanisms. Thus, when braking is called for, the operator of the vehicle opens the valve to supply compressed air to the bellows 63 of each brake mechanism 32 and 33. This will in turn, force the brake lining 64 in contact with the substantially horizontal surface 27 of the rail 13 and the braking force will be transferred to the frame member 34 through links 67 and 68. The bellows 63 is constructed of a material having sufficient resiliency to lift the friction material 64 from the horizontal surfaces 27 of the rails when the air supply to the bellows is cut off.

Spring means are provided for mounting the frame member 34 from the structural member or pipe 81. This means preferably takes the form of a pair of torsion bars, one of which is shown in FIGURE 3 at 86 and the other of which is shown in FIGURE 4 at 87. FIGURE 4 discloses approximately one half of the control and support mechanism 25 shown in FIGURE 3. The left end of FIGURE 4 is taken approximately through the midpoint of the air pressure levitation device 26.

Figure 8:
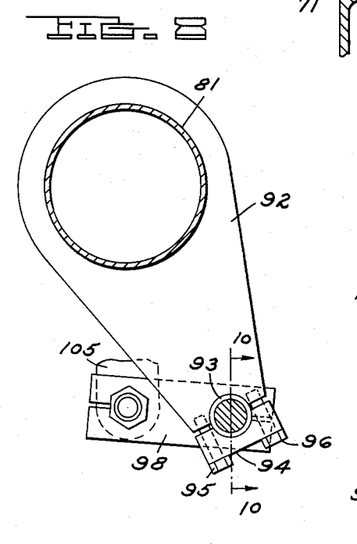
FIGURE 8 is a sectional view partially in elevation taken along the lines 8—8 of FIGURE 4.

The torsion bar 87 is positioned so that its axis is substantially parallel to the axis of the support member or pipe 81. One end 88 of the torsion bar 87 is affixed by means of a suitable connection, for example a spline connection 89, to a collar member 91. This collar member 91 fits around the pipe 81 and is suitably affixed thereto, for example by welding as shown in the FIGURES 4 and 5 so that it serves as an anchor for end 88 of the torsion bar 87. Torsion bar 87 extends through a torsion bar bearing support member 92 that preferably takes the form of a collar member similar to collar member 91. The torsion bar bearing support member 92 is best shown in FIGURE 8 and it includes a sleeve bearing 93 that is suitably held by means of a cap 94 and a pair of bolts 95 and 96. This torsion bar bearing support member 92 is positioned on the pipe 81 in a manner to permit it to rotate with respect to and about the center of pipe 81. The reason for this will be more fully developed at a later point in the specification. The other end 97 of the torsion bar 87 is non-rotatably affixed to a torsion bar link 98. The end 97 of the torsion bar 87 is preferably of square configuration and it fits within a square aperture 99 in the torsion bar link 98. The end of the torsion bar link containing the square aperture 99 has a slot 101 positioned therein and the squared end 97 of the torsion bar 87 is rigidly held within the aperture 99 by means of a nut and bolt 102 that passes through the end of the torsion bar link 98.

Figure 9:
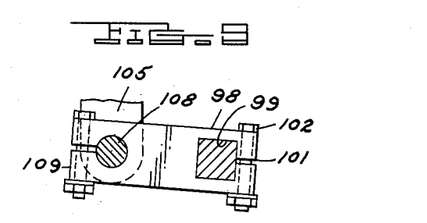
FIGURE 9 is a sectional view partially in elevation taken along the lines 9—9 of FIGURE 4.
Figure 10:
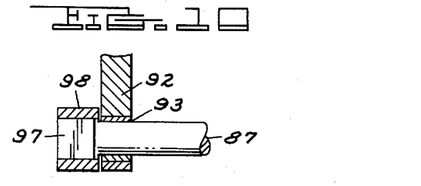
FIGURE 10 is a section view partially in elevation taken along the lines 10—10 of FIGURE 8.

The torsion bar link 98 is connected to the frame member 34 by means of a frame link 105. As can best be seen by reference to FIGURE 4, the frame link 105 carries a sleeve bearing 106 at one end and another sleeve bearing 107 at the other end. A pin 108 extends through the bearing 106 and is affixed to the torsion bar link 98 by means of a slotted end connection 109 that can best be seen by reference to FIGURE 9. This pin 108, may take the form of a nut and bolt assembly so that the torsion bar link 98 and the link 105 may be properly positioned in an axial direction along the longitudinal axis of the pin. Since the link 105 must rotate with respect to the torsion bar link 98 a thrust washer 110 is provided between them (see FIGURE 4). The other end of link 105 is affixed to the frame member 34 through a similar pin connection preferably a nut and bolt assembly 112. The nut and bolt assembly 112 includes an elongated bolt 113 that passes through bosses 114 and 114¹ on the frame member (see FIGURES 4 and 12).

Figure 11:
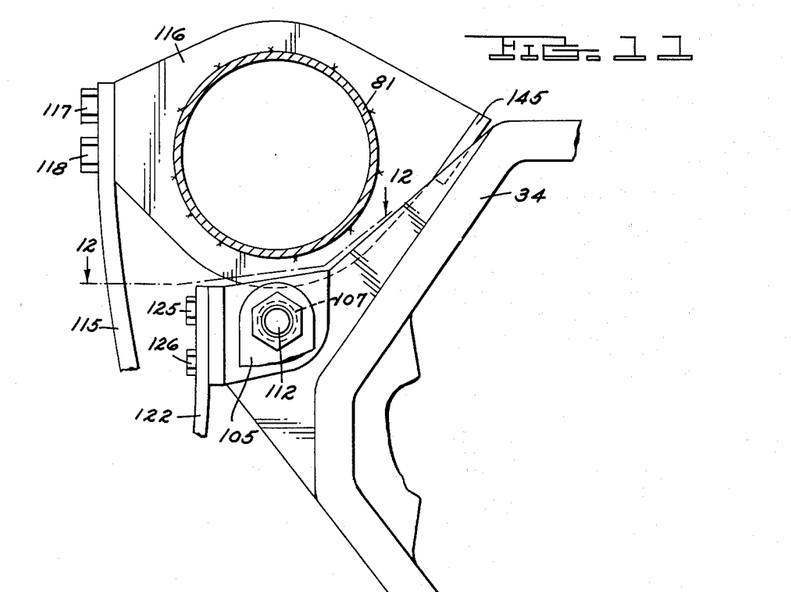
FIGURE 11 is a sectional view partially in elevation taken along the lines 11—11 of FIGURE 4, and, FIGURE 12 is a sectional view partially in elevation taken along the lines 12—12 of FIGURE 11.

Means are also provided for properly positioning the frame member 34 and the components that it carries in proper relationship to the rail 13 in a direction transverse to the longitudinal axis of the vehicle. This means thus properly positions the air pressure levitation device 26 and the brake mechanisms 32 and 33 in centered relationship over the substantially horizontal surface 27 of the rail 13. It also properly positions the safety pad 37 beneath the second substantially horizontal surface 36 of rail 13. This means preferably takes the form of a leaf spring arrangement in which a first leaf spring 115 has one end thereof affixed to a leaf spring anchor block 116 (see FIGURES 4 and 5). This leaf spring anchor block is supported by the pipe 81 and is affixed thereto preferably by welding as shown in FIGURE 11. The leaf spring 115 may be fastened to the leaf spring anchor block 116 by any suitable fastening means, for example by bolts 117 and 118. Second and third leaf springs 121 and 122 most clearly shown in FIGURE 4 are affixed to the frame member 34 by any suitable means, for example by bolts 123, 124, 125 and 126.

Figure 6:
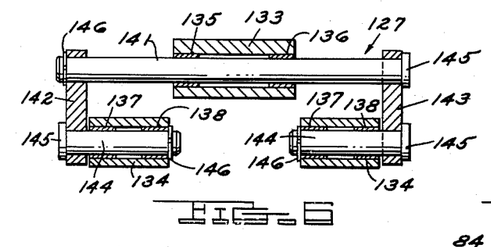
FIGURE 6 is a sectional view partially in elevation taken along the lines 6—6 of FIGURE 4.
Figure 12:
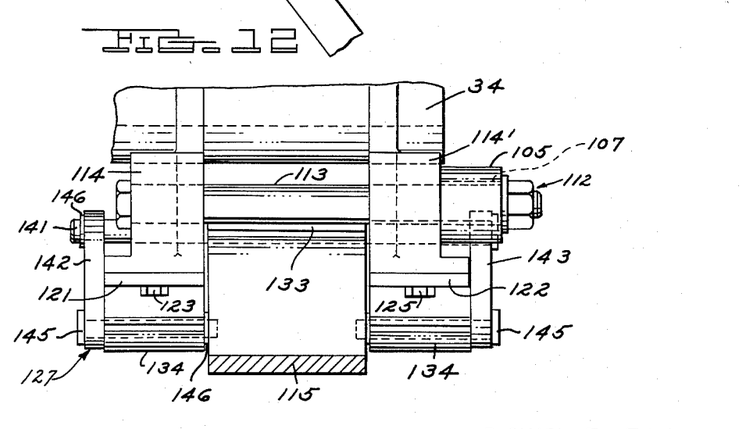

The lower extremities of the leaf springs 115, 121 and 122 are connected together by means of a clevis assembly 127 that can best be seen by reference to FIGURES 5, 6 and 12. As can best be seen by reference to FIGURE 5, the leaf spring 115, has a rolled over end portion 133, and each of the leaf springs 121 and 122 has a rolled over end portion 134. Referring back to FIGURE 6, the rolled over end portion 133 of spring 115 carries a pair of sleeve bearings 135 and 136 while the rolled over end portions 134 of leaf springs 121 and 122 each carry a pair of sleeve bearings designated by the numerals 137 and 138. A rod 141 passes through the sleeve bearings 135 and 136 and rolled over end portion 133 of spring 115 and through a pair of links 142 and 143. A pin 144 engages each of the links 142 and 143 and passes through the bearings 137 and 138 and the rolled over end portions 134 of leaf springs 121 and 122. It can be seen that the rod 141 and the pins 144 are suitably connected to the various members by enlarged heads and C spring clips designated by the numerals 145 and 146 respectively. This structure thus permits pivotal movement of the rolled over end portions 134 of springs 121 and 122 about the rolled over end portion 133 of spring 115 and it also permits pivotal movement of the rolled over end portion 133 of spring 115 about the rolled over end portions 134 of the springs 121 and 122.

It is considered that the structure and function of the invention will become more fully apparent as the operation of the invention is described. Referring now to FIGURE 5, it will be assumed that the structure shown and described above is in a position of equilibrium. If a vertical downward force is now applied to the vehicle such as that incurred when additional loads are received on the vehicle, the structural member or pipe 81 that is affixed to the vehicle will move downwardly while the air pressure levitation device 26 will remain in substantially the same position with respect to the horizontal surface 27 of the rail 13 because of the thin layer of air under pressure formed between the air pressure levitation device and the horizontal surface 27. Such a movement will cause the torsion bar 87 to move downwardly through the action of the collar 91 and the torsion bar bearing support 92. On the other hand, the frame support member 34 will remain in substantially the same position because it is connected to the gas pressure levitation device 26. Movement of the torsion bar 87 downwardly will cause the torsion bar link 98 to rotate in a clockwise direction about the axis of pin 108. Although the pin 108 is affixed to the torsion bar link 98 by means of slotted end connection 109, it is free to turn within its bearing 106 positioned in link 105. The link 105 which is pivotally attached to the frame member 34 will tend to align itself in the position shown in FIGURE 5. The result of this movement is to torsionally deform the torsion bar 87 since the end 97 that is affixed to the torsion bar link 98 is rotated through an angle commensurate with the load applied to the vehicle, and the other end 88 of the torsion bar 87 that is affixed to the collar 91 is held stationary. It can readily be realized that the reverse situation will happen if the vertical loading of the vehicle changes so that the vehicle is carrying less weight. In this case, the link 98 will rotate in a counterclockwise direction about the bearing 106 and about the axis of the pin 108.

An inspection of FIGURE 5 will reveal that the leaf springs 115, 121 and 122 are shaped to cause the clevis assembly 127 to be moved toward the rail 13 and that force is imparted from leaf spring anchor block 116 through the leaf springs 115, 121 and 122 to the frame member 34 to move it toward the rail 13. This leaf spring arrangement thus properly positions the air pressure levitation devices 31 in opposed relationship to the substantially vertical surface 28 of the rail 13 and it also properly centers air pressure levitation device 26 and the bearing mechanisms 32 and 33 over the substantially horizontal surface 27 of the rail 13. At the same time, the frame 34 can move laterally or in a direction transverse to the axis of the vehicle against the force of the leaf springs 115, 121 and 122 if any irregularities should occur in the rail system or should lateral loads tempt to force the vehicle 10 laterally on the track system 11.

It can be seen by reference to FIGURE 5 that the clevis assembly 127 will permit relative vertical movement between the pipe 81 and the frame member 34 since the leaf springs 115, 121 and 122 are pivotally mounted through the rolled over end portions 133 and 134 to the rod 141 and the pins 144 respectively. Thus, if the pipe 81 should move downwardly with respect to the frame member 34 due to increased vertical loading on the vehicle 10, the links 142 and 143 and the rolled over end portion 133 of spring 115 could pivot about the pins 144 in a clockwise direction. On the other hand, if the vertical loading were decreased, the links 142 and 143 and the rolled over portion 133 of the leaf spring 115 could pivot in a counterclockwise direction about the pins 144 and the rolled over portion 134 of springs 121 and 122. Thus, the leaf springs 115, 121 and 122 and their associated structure described above not only resiliently positions the frame member 34 transversely of the vehicle but the leaf springs and their associated structures also permit vertical movement of the vehicle 10 relative to the frame member 34.

Also, the torsion bar mounting arrangement discussed above not only springs the weight of the vehicle but it also permits transverse movement of the frame member 34 with respect to the remainder of the vehicle. The torsion bar 87 is permitted to deflect in bending about its end 88 when transverse movement of the frame member 34 takes place relative to the vehicle 10, since the torsion bar bearing support 92 is pivotally mounted on the pipe 81. The torsion bar bearing support member 92 will pivot clockwise about the center of pipe 81, as viewed in FIGURE 5, when the frame member 34 moves inwardly toward the center of the vehicle and will pivot counterclockwise about the center of the pipe when the frame member 34 moves outwardly with respect to the vehicle 10.

The universal mounting of the air pressure levitation devices 26 and 31 to the frame member 34, and the mounting of the frame member 34 to the structural member 81 of the vehicle 10 through the torsion bar 87 and the leaf springs 115, 121 and 122 provides a system in which the vehicle 10 and structural member 81 may move both vertically and horizontally, or any combination of these movements, with respect to the frame member 34. It is also apparent from an inspection of FIGURES 4 and 5 that the frame member 34 may pivot relative to the vehicle about the axis of the torsion bar 87. In this case the universal mountings of the air pressure levitation devices on the frame member 34, permit the forces exerted by the thin layer of air under pressure between the air pressure levitation devices 26 and 31 and the surfaces 27 and 28 of the rails 12 and 13 to properly position these devices in spaced relationship to the surfaces 27 and 28 of the rails.

It can be seen by reference to FIGURES 3, 5 and 11 that the leaf spring anchor block 116 includes an abutment or stop portion 145 that limits both vertical and horizontal movement of the frame member 34 with respect to the structural member or pipe 81 of the vehicle 10.

Referring back to FIGURES 1 and 3, it is to be understood that a plurality of the suspension and control mechanisms 25 may be positioned along and supported by the pipe 81 at regular intervals along the length of the vehicle 10. Additionally, another pipe 81 may be positioned in the vehicle 10 in close proximity to the rail 12 and a plurality of suspension and control mechanisms 25 may be connected to this pipe at regular intervals along the length of the vehicle 10.

The present invention thus provides a reliable and practical suspension system for supporting and/or controlling an air supported vehicle for movement over surfaces that preferably form a portion of a rail system.

It will be understood that the invention is not to be limited to the exact construction shown and described, but that various changes and modifications may be made without departing from the spirit and scope of the invention as defined in the appended claims.

1. A suspension system for an air supported vehicle adapted to be supported from a surface having a substantial horizontal component by air under pressure comprising, a frame member, an air pressure levitation device connected to said frame member and adapted to be positioned in opposed relationship to the surface having a substantial horizontal component, the vehicle having a structural member extending in a direction substantially parallel to the longitudinal axis of the vehicle, and a torsion bar interconnecting said structural member and said frame member and adapted to spring at least a portion of the weight of said vehicle.

2. A suspension system for a vehicle supported from a surface having a substantial horizontal component by means of air under pressure, comprising means for supplying a thin layer of air under pressure between the surface having a substantial horizontal component and said means, a structural member carried by said vehicle, and spring means interconnecting said second mentioned means and said structural member for springing at least a portion of the weight of the vehicle.

3. A suspension system for a vehicle supported from a rail by means of air under pressure, comprising first means for supplying a thin layer of air under pressure between a surface of the rail having a substantial horizontal component and said first means, second means for supplying a thin layer of air under pressure between a surface of the rail having a substantial vertical component and said second means, a frame member connected to said first means and said second means, a torsion bar, said vehicle including a structural member, said torsion bar interconnecting said frame member and said structural member for springing the weight of the vehicle, and spring means engaging said frame member and said structural member for urging said second means into closely spaced relationship with said surface of the rail having a substantial vertical component.

4. A suspension system for a vehicle supported on and guided on a rail by means of air under pressure, comprising first means for supplying a thin layer of air under pressure between a substantially horizontal surface of the rail and said first means, second means for supplying a thin layer of air under pressure between a substantially vertical surface of the rail and said second means, a frame member, said first means and said second means each being universally mounted upon said frame member, a structural member of the vehicle extending in a direction substantially parallel to the longitudinal axis of the vehicle, a torsion bar extending in a direction substantially parallel to longitudinal axis of the vehicle, means for fixing one end of said torsion bar to said structural member, linkage means for connecting the other end of said torsion bar to said frame member, said torsion bar springing at least a portion of the weight of the vehicle, and spring means engaging said structural member and said frame member for urging said frame member in a transverse direction with respect to the longitudinal axis of the vehicle whereby said second means is positioned in closely spaced relationship with said substantially vertical surface of the rail and said first means is positioned in spaced relationship over the substantially horizontal surface of the rail.

5. A suspension system for a vehicle supported from a rail by means of air under pressure, comprising first means for supplying a thin layer of air under pressure between a substantially horizontal surface of the rail and said first means, second means for supplying a thin layer of gas under pressure between a substantially vertical surface of the rail and said second means, a frame member connected to said first means and said second means, a brake mechanism connected to said frame member and having friction material positioned in spaced relationship to a substantially horizontal surface of the rail, said brake mechanism being adapted to move said friction material into engagement with the substantially horizontal surface of the rail when actuated, a torsion bar, said vehicle including a structural member, said torsion bar interconnecting said frame member and said structural member for springing the weight of the vehicle, and spring means engaging said frame member and said structural member for urging said second means into closely spaced relationship with said substantially vertical surface of the rail.

6. A high speed transportation system comprising, a pair of spaced parallel rails, each of said rails having a substantially horizontal surface and a substantially vertical surface, a vehicle adapted for movement along said rails, said vehicle having a pair of longitudinally extending pipes, one pipe being positioned adjacent one of said rails and the other pipe being positioned adjacent the other of said rails, a support and suspension mechanism interposed between each pipe and rail, each support and suspension mechanism comprising a first air pressure levitation device positioned adjacent the substantially horizontal surface of one rail and a second air pressure levitation device positioned adjacent the substantially vertical surface of said one rail, a frame connected to said first and second air pressure levitation devices, spring means interconnecting said frame and said pipe positioned adjacent said one rail for springing a portion of the weight of said vehicle, and second spring means interconnecting said frame and said pipe for urging said frame toward said one rail in a substantially horizontal direction, a pipe carrying a supply of air under pressure, and conduit means connecting said first and said second air pressure levitation devices with the supply of air under pressure in said pipe.

7. A high speed transportation system comprising, a pair of spaced rails, each of said rails having a surface with a substantial horizontal component and a surface with a substantial vertical component, a vehicle adapted for movement along said rails, said vehicle having a pair of longitudinally extending structural members, one structural member being positioned adjacent one of said rails and the other structural member being positioned adjacent the other of said rails, a plurality of suspension and support mechanisms interconnecting said structural members and said rails, each of said suspension and support systems comprising, a first air pressure levitation device positioned in opposed relationship to said surface with a substantial horizontal component of one of said rails and a second air pressure levitation device positioned in opposed relationship to said surface with a substantial vertical component of said one rail, a frame member connected to said first and said second air pressure levitation devices, a radially extending means connected to the structural member positioned adjacent said one rail, a torsion bar affixed to said radially extending means and to said frame member for connecting said frame member and said air pressure levitation devices to said one structural member for springing at least a portion of the weight of the vehicle.

8. A mechanism for supporting and guiding a vehicle along a rail having a substantially horizontal surface and a substantially vertical surface comprising, a vehicle structural member, a first air pressure levitation device positioned in opposed relationship to said substantially horizontal surface and a second air pressure levitation device positioned in opposed relationship to said substantially vertical surface, a frame member for said air pressure levitation devices, universal mounting means interconnecting said first and said second air pressure levitation devices with said frame member, and spring means interconnecting said vehicle structural member and said frame member for said air pressure levitation devices for springing at least a portion of the weight of the vehicle.

9. The mechanism of claim 8 in which said structural member extends in spaced parallel relationship to said rail and said spring means is a torsion bar extending in a direction substantially parallel to said vehicle structural member and said rail.

10. The mechanism of claim 9 which is further characterized by means engaging said vehicle structural member and said frame member for urging said frame member transversely of said structural member toward said rail.

11. The mechanism of claim 10 in which said means comprises a plurality of leaf springs constructed and arranged to engage said vehicle structural member and said frame member.

12. A suspension system for an air supported vehicle adapted to be supported from a surface having a substantial horizontal component by air under pressure comprising, a frame member, an air pressure levitation device connected to said frame member and adapted to be positioned in opposed relationship to the surface having a substantial horizontal component, said vehicle having a structural member, and a torsion bar interconnecting said structural member and said frame member for springing a portion of the weight of the vehicle.

References Cited in the file of this patent

UNITED STATES PATENTS

| | | |
|---|---|---|
| 1,000,009 | Jenison | Aug. 8, 1911 |
| 1,685,035 | Robertson | Sept. 18, 1928 |
| 2,371,169 | Hickman | Mar. 13, 1945 |
| 2,511,979 | Goddard | June 20, 1950 |
| 2,985,114 | Lindner | May 23, 1961 |
| 3,013,505 | Burke | Dec. 19, 1961 |
| 3,055,312 | Jay et al. | Sept. 25, 1962 |

FOREIGN PATENTS

| | | |
|---|---|---|
| 878,818 | Great Britain | Oct. 4, 1961 |